United States Patent
Jensen et al.

(10) Patent No.: US 7,827,730 B1
(45) Date of Patent: Nov. 9, 2010

(54) FISHING LURE HAVING A CONTROLLED RATTLE

(75) Inventors: Harold Jensen, Fort Smith, AR (US);
Bruce Brown, Van Buren, AR (US)

(73) Assignee: EBSCO Industries, Inc., Birmingham, AL (US)

( * ) Notice: Subject to any disclaimer, the term of this patent is extended or adjusted under 35 U.S.C. 154(b) by 106 days.

(21) Appl. No.: 12/135,585

(22) Filed: Jun. 9, 2008

Related U.S. Application Data

(60) Provisional application No. 60/942,566, filed on Jun. 7, 2007.

(51) Int. Cl.
*A01K 85/01* (2006.01)
(52) U.S. Cl. ..................... 43/42.31; 43/43.14
(58) Field of Classification Search ................ 43/42.31, 43/42.22, 43.14
See application file for complete search history.

(56) References Cited

U.S. PATENT DOCUMENTS

| | | | |
|---|---|---|---|
| 2,488,678 A | 11/1949 | Nardi | |
| 2,662,336 A * | 12/1953 | Zalkind | ...................... 446/170 |
| 2,718,725 A * | 9/1955 | Thurman | .................... 43/42.31 |
| 2,738,610 A | 3/1956 | Everett | |
| 2,752,725 A * | 7/1956 | Unsworth | .................... 446/166 |
| 2,909,863 A | 10/1959 | Rector et al. | |
| 3,071,884 A | 1/1963 | Peltz | |
| 3,449,852 A | 6/1969 | Mitchell | |
| 3,877,168 A | 4/1975 | Stevens | |
| 3,894,350 A | 7/1975 | Parker | |
| 3,905,147 A | 9/1975 | Snipes | |
| 3,935,660 A | 2/1976 | Plew | |
| 4,203,246 A | 5/1980 | Sacharnoski, Sr. | |
| 4,453,335 A | 6/1984 | Smith | |
| 4,483,091 A * | 11/1984 | Norlin | ........................ 43/42.31 |
| 4,745,700 A | 5/1988 | Davis | |
| 4,803,793 A | 2/1989 | Schellenberg, III | |
| 4,930,247 A | 6/1990 | Dubois | |
| 4,969,287 A | 11/1990 | Johnson | |
| 4,995,189 A | 2/1991 | Crihfield | |
| 5,024,019 A | 6/1991 | Rust et al. | |
| 5,134,799 A | 8/1992 | Trnka | |
| 5,139,455 A * | 8/1992 | Israel | .......................... 446/219 |

(Continued)

FOREIGN PATENT DOCUMENTS

WO     WO 9014761     12/1990

(Continued)

OTHER PUBLICATIONS

Advertisement for "RATTLIN' RAPALA"; www.rapala.com.

(Continued)

*Primary Examiner*—Joshua J Michener
(74) *Attorney, Agent, or Firm*—Smith Gambrell & Russell LLP

(57) ABSTRACT

A fishing lure includes a rattle that is adjustable between a rattling mode and a muted mode. The fishing lure includes a body having an outer surface and an inner surface. Inside the body is a rattle chamber and a muted chamber, with a channel connecting the rattle chamber with the muted chamber. The rattle is moveable between the muted chamber and the rattle chamber to determine when rattling is available and when the rattle is muted.

19 Claims, 5 Drawing Sheets

U.S. PATENT DOCUMENTS

| | | |
|---|---|---|
| 5,144,765 A | 9/1992 | Keeton |
| 5,259,151 A | 11/1993 | Wicht |
| 5,381,622 A | 1/1995 | Tregre |
| 5,829,183 A * | 11/1998 | Guerin ................ 43/42.35 |
| 5,992,084 A | 11/1999 | Kitagawa |
| 6,609,326 B2 | 8/2003 | Salonen et al. |
| 7,310,906 B1 | 12/2007 | Woller, Sr. |
| 2001/0047609 A1 | 12/2001 | Orgeron |
| 2002/0014031 A1 | 2/2002 | Brinkman |
| 2002/0032977 A1 | 3/2002 | Wacha |
| 2003/0093939 A1 | 5/2003 | Salonen et al. |
| 2005/0072038 A1 | 4/2005 | Daley |
| 2005/0223620 A1 | 10/2005 | Pixton |

FOREIGN PATENT DOCUMENTS

| | | |
|---|---|---|
| WO | WO 00/22922 | 4/2000 |
| WO | WO 02/94017 | 5/2002 |
| WO | WO 2004/019677 | 3/2004 |

OTHER PUBLICATIONS

Advertisement for "Cabela's RealImage Plus Jointed Rad Shad"; www.cabelas.com.

Advertisement for "Cabela's Fisherman Series Mini-Dig-It"; www.cabelas.com.

* cited by examiner

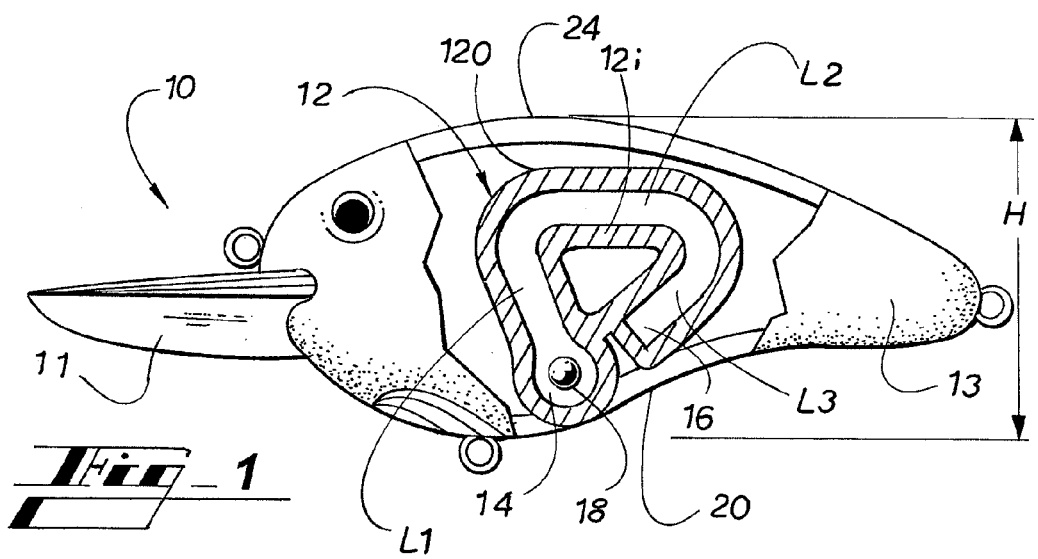
Fig_1
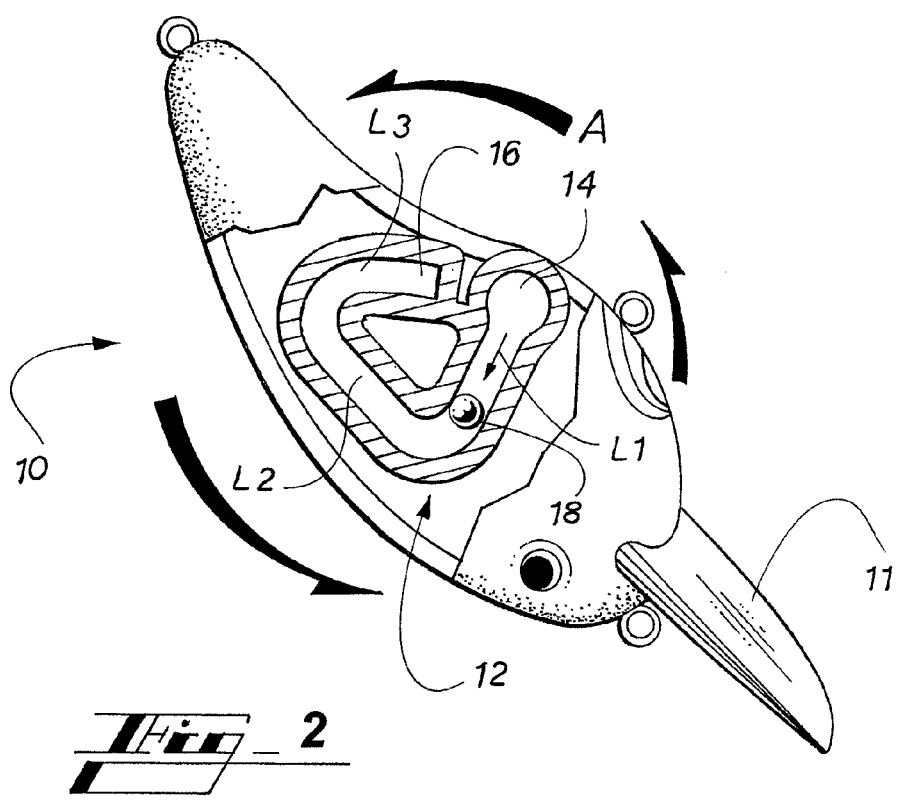
Fig_2

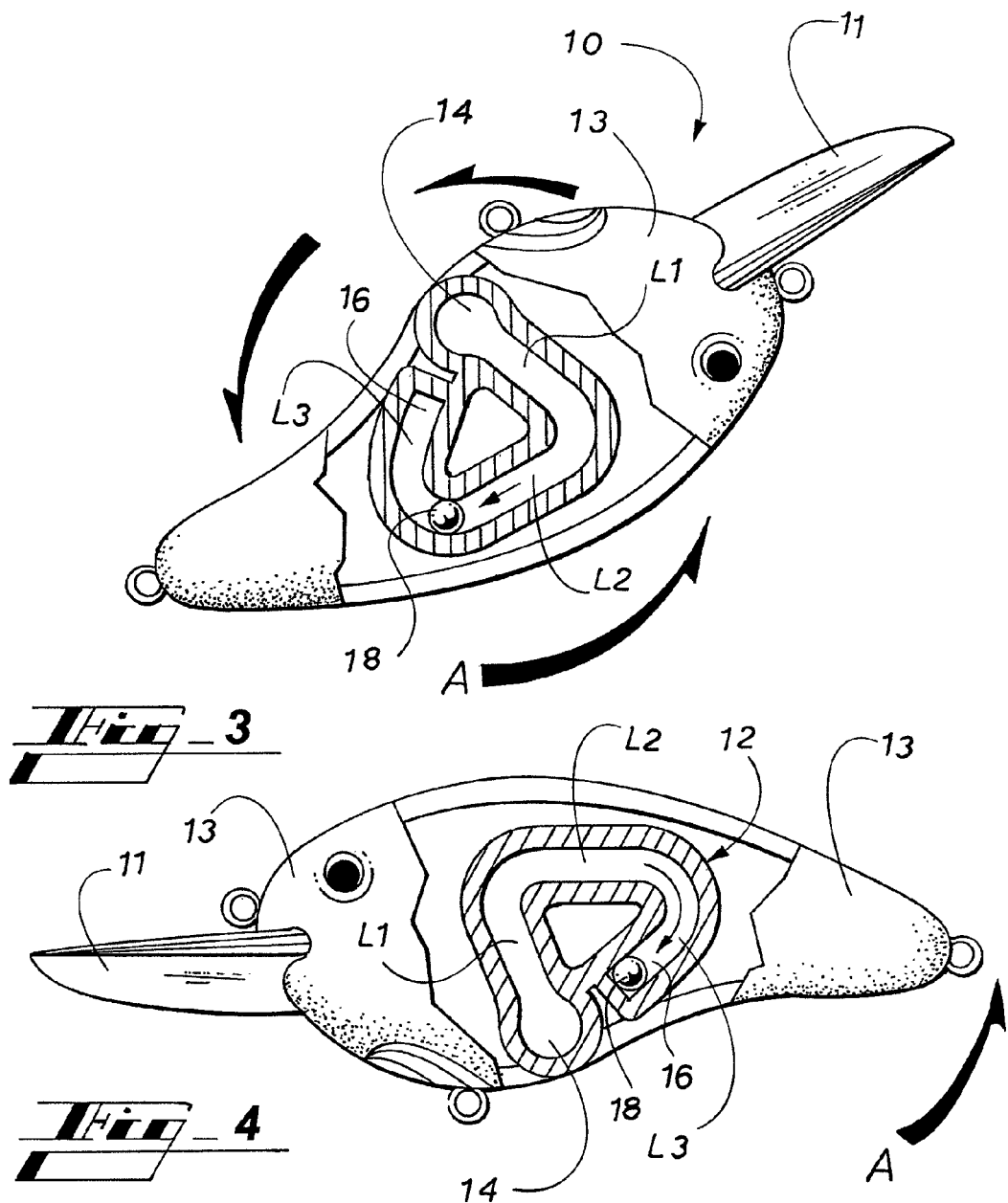

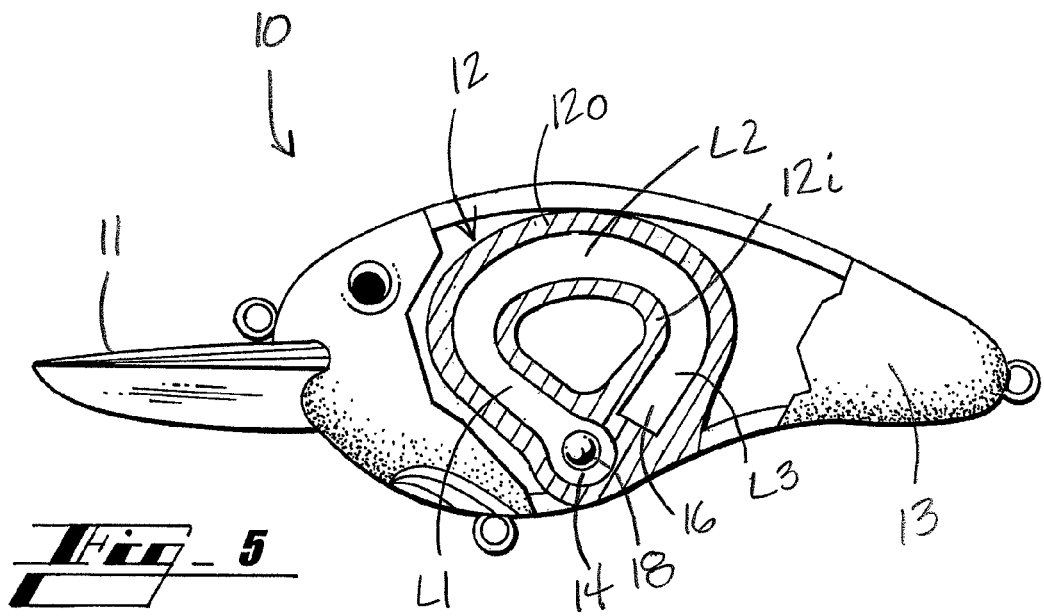
Fig_5
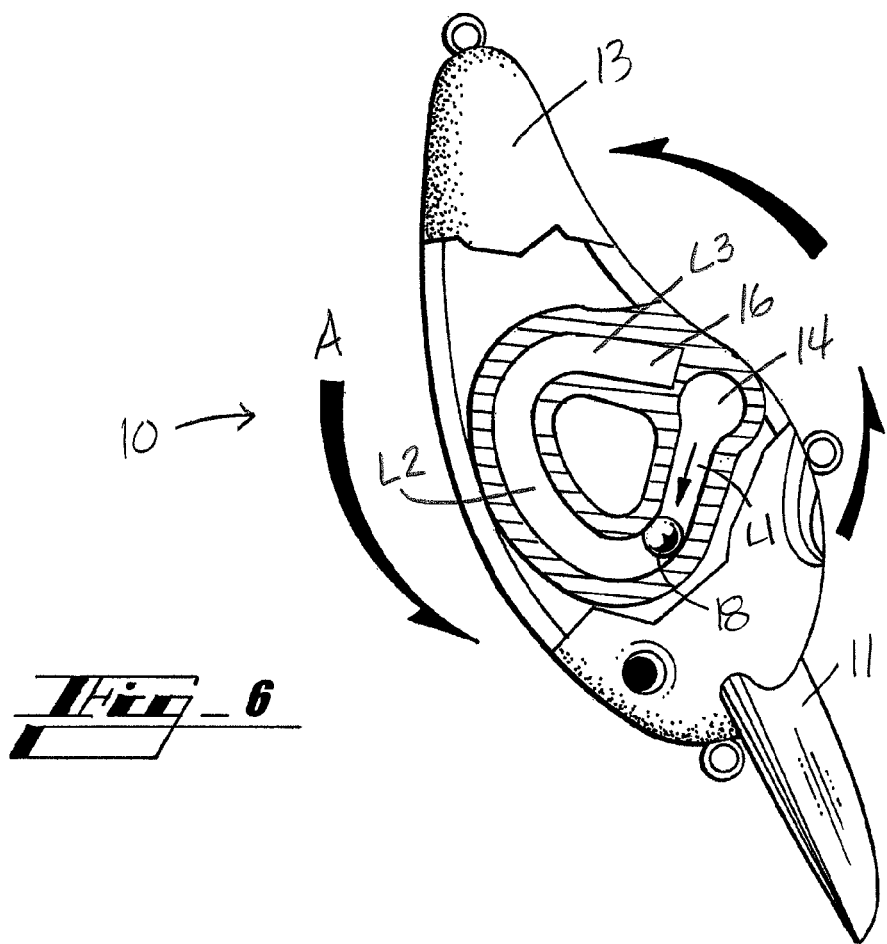
Fig_6

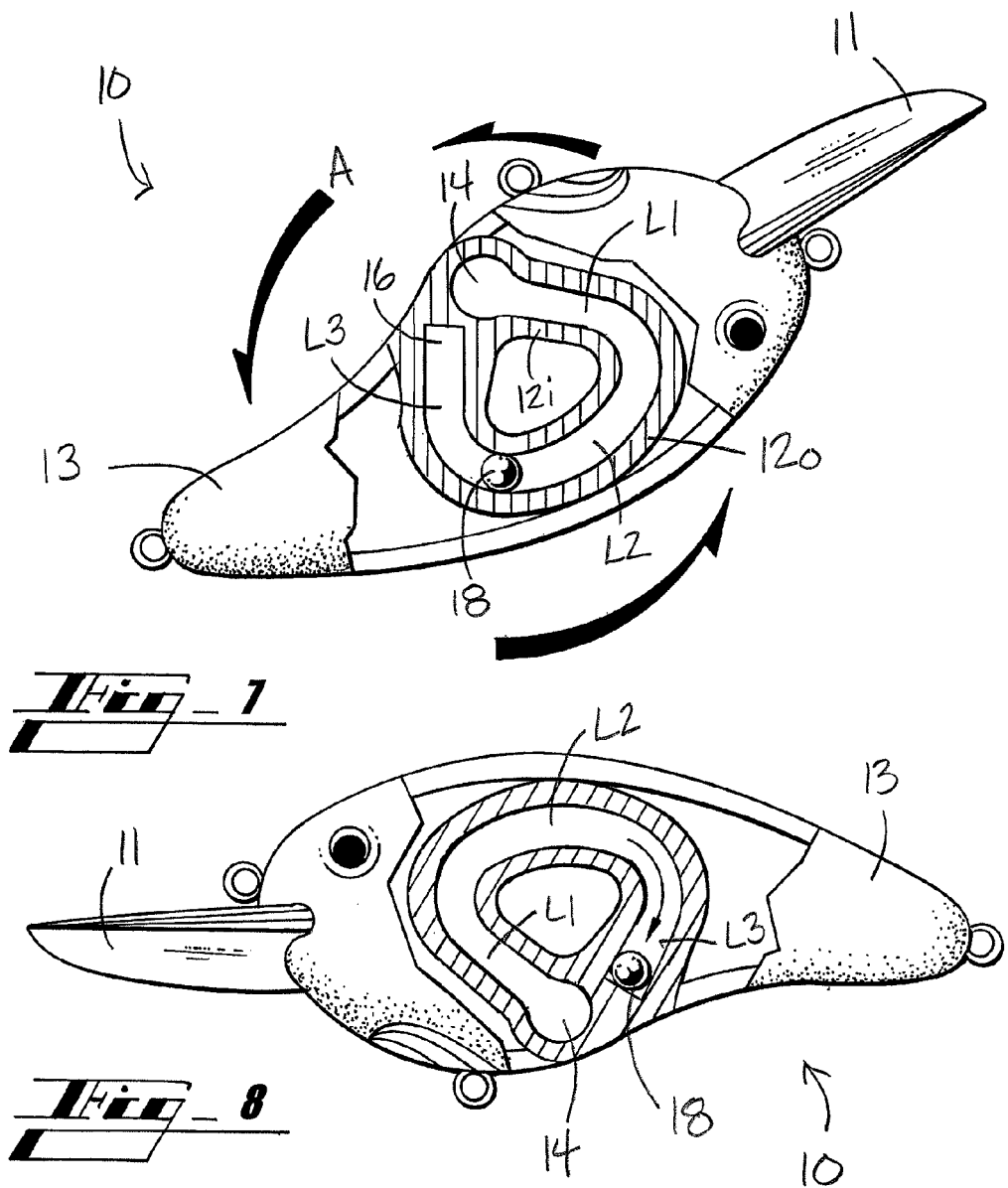

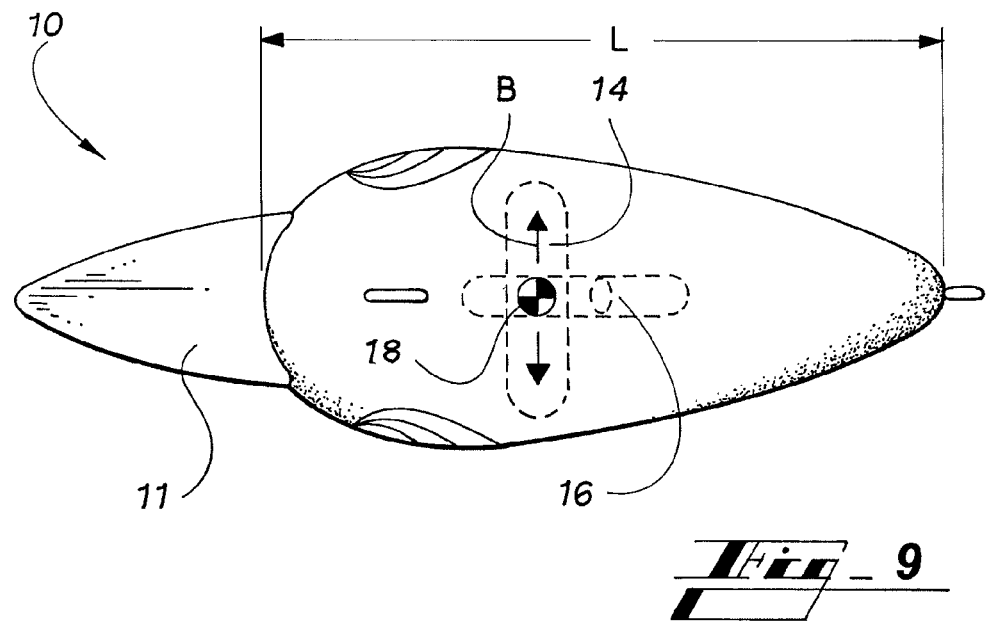
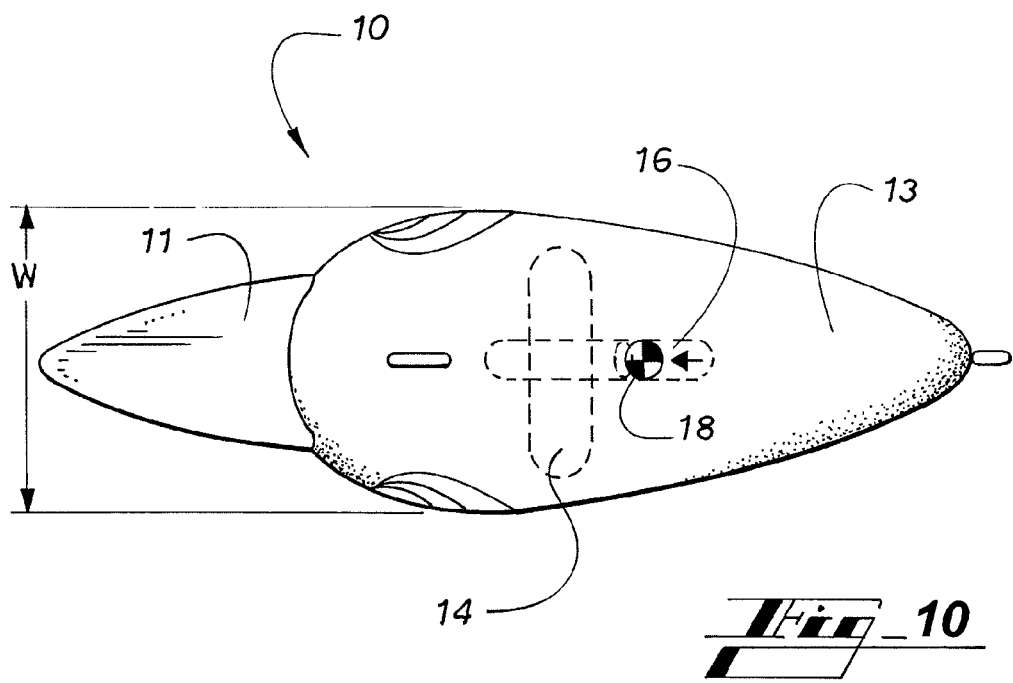

FISHING LURE HAVING A CONTROLLED RATTLE

CROSS REFERENCE TO RELATED PATENT APPLICATIONS

This application claims the benefit of priority of U.S. provisional application Ser. No. 60/942,566, filed Jun. 7, 2007, said application being relied upon and incorporated herein by reference.

BACKGROUND OF THE INVENTION

One of the most important aspects of fishing is to attract fish. That is, the fish must be enticed to seize the hook on a lure in order for the fisherman to be successful. One of the oldest ways to attract fish to the hook is to simply put live bait on the hook, such that the motion of the bait will attract the desired fish. In addition to live bait, artificial baits have commonly been used, with innumerable lure designs having the appearance of a fish, frog or other animal that is attractive to fish as a food source. With artificial baits, various accessories are used to attract fish into the general vicinity, such as the realistic appearance of the fishing lure or the creation of particular noises or vibrations in the water to attract the fish.

To create noise, lures have been designed to rapidly revolve when drawn through the water to create a whistle-like sound, or to include a rattle that will generate noise as the fishing lure is retrieved in water. A drawback to such designs is that the user may desire for the fishing lure to rattle at certain times, but be mute at other times. As a result, the user may have to physically remove and replace the fishing lure, which can require significant amounts of time and effort, and dissuades the user from changing lures when desired.

SUMMARY OF THE INVENTION

A fishing lure is described herein that includes a rattle that can easily be moved from a rattling position and a muted position within the fishing lure. The adjustment between the rattling position and the non-rattling position is accomplished by rotating the fishing lure in a desired motion to adjust the position of the rattle in the body of the fishing lure. As a result, the user of the fishing lure can transform it from a rattling lure to a silent lure, or vice versa, at any time.

More specifically, the fishing lure includes an internal connection channel connecting the open rattle chamber with the muted chamber. The channel is designed to prevent undesired travel of the rattle within the fishing lure, such that the rattle will substantially remain in either the rattle chamber or in the muted chamber. In particular, the rattle chamber has a diameter that is greater than the diameter of the rattle, with the rattle chamber extending substantially along the width of the fishing lure to allow movement of a rattle or weight in the rattle chamber and generate a corresponding noise for attracting fish. In contrast, the width of the muted chamber is substantially the equivalent, or slightly larger, of the diameter of the rattle. This allows the rattle to enter the muted chamber, but allows very little movement otherwise. Therefore, the movable weight will produce a rattling sound while located in the open rattle chamber during agitation or movement of the fishing lure, but little or no sound when the fishing lure is moved or agitated and the rattle is trapped in the muted chamber.

DESCRIPTION OF THE DRAWINGS

FIG. 1 is a perspective view of the fishing lure having an easily adjusted rattle, said center portion of the fishing lure being sectional to illustrate the rattle;

FIGS. 2 and 3 are perspective views of the fishing lure as illustrated in FIG. 1, FIGS. 2 and 3 showing the rotation of the fishing lure to adjust the position of the rattle;

FIG. 4 is a perspective view of the fishing lure as illustrated in FIG. 1, the rattle being positioned in a chamber to limit noise generation;

FIGS. 5-8 provide a perspective view of an embodiment corresponding to the one shown in FIGS. 1-4; and FIGS. 9 and 10 are bottom views of the fishing lure as illustrated in FIGS. 1 and 5, the figures showing the connection channel and rattle chamber illustrated in phantom.

DESCRIPTION OF THE INVENTION

Looking at the attached figures, a fishing lure 10 is illustrated that can be adjusted between a position in which a rattle or weight 18 produces a rattle sound when agitated (see FIGS. 1 and 5) and a position in which the rattle 18 produces little or no rattle sound when the fishing lure 10 is agitated (see FIGS. 4 and 8). The adjustment between the rattling position and the non-rattling position is accomplished by rotating the fishing lure 10 in a desired motion to adjust the position of the rattle 18 in the body 13 of the fishing lure 10. As a result, the user of the fishing lure 10 can transform it from a rattling lure to a substantially silent lure, or vice versa, at any time, including while the fishing lure 10 is attached to fishing line, without requiring the disassembly or intrusion upon the body 13 of the fishing lure 10 itself.

More specifically, the fishing lure 10 includes an internal connection channel or passage 12 connecting a first chamber 14, or an open rattle chamber, with a second chamber 16, or a closed muted chamber. In particular, the rattle 18 of the fishing lure 10 has a rattle diameter, and the rattle chamber 14 has a width or diameter (depending on the shape of the chamber 14) that is greater than the rattle diameter 18, with the rattle chamber 14 extending laterally substantially along the width W of the fishing lure 10 (see FIGS. 9 and 10) to allow lateral movement of the rattle 18 in the rattle chamber 14 to generate a corresponding noise for attracting fish. In contrast, the width of the muted chamber 16 is substantially the equivalent, or slightly larger, of the rattle diameter, and there is little or no lateral movement of the rattle 18 in the muted chamber 16. As a result, the rattle 18 is able to enter the muted chamber 16, although there is very little movement of the rattle 18 in the muted chamber 16 otherwise. Consequently, the movable rattle 18 will produce a rattling sound while located in the open rattle chamber 14 during agitation or movement of the fishing lure 10, such as when retrieved in water, but little or no sound when the fishing lure is moved or agitated and the rattle 18 is trapped in the muted chamber 16.

The rattle 18 illustrated is generally spherical and can be made of a variety of materials, with examples including a round steel or brass ball, or a ball made of tungsten. Gravity and the shape of the connection channel 12 will generally keep the rattle 18 in the chamber selected by the user during use (either in the rattle chamber 14 or the muted chamber 16). More specifically, the geometry of the chambers 14, 16 and connection channel 12 is such that during casting of the fishing lure 10, the initial forces acting on the rattle 18 will keep it in the selected chamber 14, 16. Furthermore, the orientation of the fishing lure 10 as it is retrieved in water will be kept upright, as guided by a bill 11, to keep the rattle 18 in the selected chamber 14, 16 during retrieval of the fishing lure 10 as well.

The fishing lure 10 has a width (W), length (L) and height (H), with the height of the fishing lure 10 being defined by the separation between a lower surface 20 of the fishing lure 10 and an upper surface 22 of the fishing lure 10. Both the rattle chamber 14 and the muted chamber 16 are positioned proximate the lower surface 20 of the fishing lure 10, with a wall or partition 24 separating the muted chamber 16 from the rattle chamber 14. The connection channel 12 joins the rattle chamber 14 with the muted chamber 16 in an indirect or somewhat circuitous manner as described further herein. As illustrated, the connection channel 12 has an inner surface 12i and an outer surface 12o that is substantially parallel to the inner surface 12i. In the embodiments illustrated in FIGS. 1-4 and 5-8, the connection channel 12 includes three lengths, namely, first length L1, second length L2, and third length L3. There is generally a first interior angle between the first length L1 and second length L2 and a second interior angle between the second length L2 and third length L3. Further, in the embodiment illustrated in FIGS. 1-4, the connection channel 12 is substantially triangular, while in the embodiment illustrated in FIGS. 5-8, the second length L2 between the first and third lengths L1, L3 has a slight arc, which further assists the user in keeping the rattle 18 in the desired chamber 14, 16 of the fishing lure 10.

Looking at the attached drawings, the rattle 18 can be moved from one chamber 14, 16 to the other chamber 14, 16 by rotating the fishing lure 10 in a circular motion A. Referring to FIG. 1, the length L of the fishing lure 10 during normal use while being retrieved in water is substantially horizontal. FIGS. 2-4 illustrate movement of the rattle 18 from the rattle chamber 14 to the muted chamber 16 to limit the amount of noise produced by the fishing lure 10 while fishing. As the user rotates the fishing lure 10 in a direction A, gravity will cause the rattle 18 to travel the first length L1 of the connection channel 12 toward the upper surface 20 of the fishing lure 10. As the user continues to rotate the fishing lure 10, the rattle 18 will travel from first length L1 to second length L2 toward the rear of the fishing lure 10. Finally, as the user returns the fishing lure 10 to the normal horizontal position shown in FIG. 4, the rattle 18 will travel the third length L3 to be securely positioned in the muted chamber 16 without allowing significant movement. As shown in the drawings in this embodiment, the fishing lure 10 is rotated counter-clockwise (in direction A) to move the rattle 18 from the rattle chamber 14 to the muted chamber 16. Once the rattle 18 is in the muted chamber 16, the user will rotate the fishing lure 10 in an opposite, clockwise direction to move the rattle 18 from the muted chamber 16 back in to the rattle chamber 14. Furthermore, it is also foreseeable that the positions of the chambers 14, 16 within the fishing lure 10 could be reversed, such that the rattle chamber 14 is positioned towards the rear of the fishing lure 10 as compared with the muted chamber 16. In such an embodiment, it is clear that the user would rotate the fishing lure 10 in opposite directions as discussed above to move the rattle 18 between the muted chamber 16 and the rattle chamber 14.

Looking to FIGS. 1 and 9, the rattle chamber 14 is shaped to allow the rattle 18 to move back and forth in a lateral motion due to the action of the fishing lure 10 as it is retried in water. More specifically, the width of the rattle chamber 14 is larger than the diameter of the rattle 18 to allow movement and generation of noise as the rattle 18 strikes the sides of the rattle chamber 14. As previously noted, the rattle chamber 14 also extends substantially along the width W of the fishing lure 10 (see FIG. 9), so that the rattle 18 is free to move in lateral direction B across the width W of the fishing lure 10 to strike the end sides of the rattle chamber 14.

In contrast, the muted chamber 16 opposite the rattle chamber 14 does not allow back and force motion of the rattle 18 within the fishing lure 10. That is, the muted chamber 16 has a substantially similar diameter as compared to the rattle 18, with no additional length along the width W of the fishing lure 10. That allows the rattle 18 to enter the muted chamber 16 without providing much, if any, room for lateral movement of the rattle 18 to engage the walls surrounding the muted chamber 16. Consequently, by directing the rattle 18 into the muted chamber, the user is able to minimize or eliminate the noise produced by the fishing lure 10 while it is in use, namely, being cast into and retrieved in water.

The shape of the path of the channel 12 helps to keep the rattle 18 in the desired chamber 14, 16, such that normal casting and retrieving forces do not allow the ball or rattle 18 to easily move between the chambers 14, 16 unless directed by the user. That is, the somewhat triangular shape of the inner wall 12i of the channel 12 as illustrated in the attached drawings prevents the rattle 18 from moving upward and around and edge or corner of the inner wall 12i. Rather, during casting and retrieval of the fishing lure 10 by the user, when an abrupt force encourages horizontal movement of the rattle 18 in the channel 12, the angled or rounded sides of inner 12i will limit upward movement and thereby prevent the rattle 18 from traveling around the inner wall 12i and into the opposing chamber 14, 16. It has been found that the somewhat triangular shapes of the inner wall 12i and the channel 12 illustrated in the embodiments shown in FIGS. 1-4 and FIGS. 5-8 provide the desired results of keeping the rattle in the desired chamber 14, 16 during use of the fishing lure 10. However, it is noted that other shapes (such as substantially circular, ellipsoidal, egg-shaped, or trapezoidal, among others) could potentially be implemented so as to contain and control movement of the rattle 18 between the muted chamber 16 and the rattle chamber 14.

Although the drawings illustrate the shape of the rattle 18, the muted and rattle chambers 14, 16, and the channel 12 connecting the chambers 14, 16, it is noted that various other designs could be substituted for use in different lures 10 according to the shape and size of the fishing lure 10 and to adjust the sound produced by the rattle 18 in the fishing lure 10. Furthermore, the channel 12 and chambers 14, 16 may either be integrally formed to the body 13 of the fishing lure 10 or affixed to interior surfaces of the fishing lure 10, as desired by the user.

Having thus described exemplary embodiments of the fishing lure having a controlled rattled, it should be noted by those skilled in the art that the within disclosures are exemplary only and that various other alternatives, adaptations, and modifications may be made within the scope of the present invention. Accordingly, this fishing lure is not limited to the specific embodiments as illustrated herein, but is only limited by the following claims.

What is claimed is:

1. A fishing lure comprising:
   a body having a length, a width and a height;
   a first chamber;
   a second chamber;
   an internal connection passage connecting said first chamber with said second chamber, said internal connection passage having a substantially consistent cross-sectional area along a length between said first chamber and said second chamber;

a rattle positioned in said body to travel between said first chamber and said second chamber in said internal connection passage, said rattle having a central cross-sectional area;

said first chamber having a first cross-sectional area slightly greater than said central cross-sectional area of said rattle to limit movement of said rattle along the width of said body; and said second chamber having a second cross-sectional area along the width of the body to allow rattling movement of said rattle along the width of said body.

2. The fishing lure as described in claim 1 wherein said second chamber extends substantially orthogonally to said internal connection passage.

3. The fishing lure as described in claim 1 wherein said internal connection passage includes a first length in a first direction, a second length in a second direction intersecting with said first direction, and a third length in a third direction intersecting with said second direction.

4. The fishing lure as described in claim 3 wherein said second length of said internal connection is arcuate.

5. A fishing lure comprising:
a body having a width, a length, and a height;
an internal connection channel within said body having a first end and a second end;
a first cavity adjoining said first end of said internal connection;
a second cavity adjoining said second end; and
said internal connection channel defining an indirect path of a total length between said first cavity and said second cavity, said indirect path having an inner surface and an outer surface, said inner surface being separated from said outer surface by a substantially constant distance along said total length of said internal connection channel; and
a rattle positioned in said body to travel between said first cavity and said second cavity via said internal connection channel, said rattle having a rattle diameter less than said constant distance separating said inner surface and said outer surface and the width of said second cavity, and wherein said rattle is held in a restrictive position in said second cavity to prohibit movement of the rattle along the width of the body and allowed free lateral movement in said first cavity.

6. The fishing lure as described in claim 5, said total length of said internal connection channel between said first cavity and said second cavity has a generally triangular shape extending along the height and length of said body, said total length of said internal connection channel including a first length extending from said first cavity, a second length connected to said first length, and a third length between said second length and said second cavity.

7. The fishing lure as described in claim 6 further comprising:
a first interior angle of said inner surface between said first length and said second length; and
a second interior angle of said inner surface between said second length and said third length, said first interior angle and said second interior angle being acute.

8. The fishing lure as described in claim 6 wherein said second length is at least slightly bowed between said first length and said third length.

9. The fishing lure as described in claim 5, wherein said first cavity substantially abuts said second cavity.

10. The fishing lure as described in claim 6 wherein said first cavity extends laterally within said body transverse to said first length to allow said first rattle to freely travel laterally in said body to generate the desired sound.

11. The fishing lure as described in claim 5 said second cavity having a width corresponding to said rattle diameter to prevent movement of said rattle along the width of said body.

12. The fishing lure as described in claim 6 wherein said first length extends in a first direction from said first cavity, said second length extends from said first length in a second direction intersecting with said first direction, and said third length extends between said second length and said second cavity in a third direction intersecting with said second direction.

13. The fishing lure as described in claim 5, said internal connection channel providing an indirect path between said first cavity and said second cavity to secure said rattle in said first cavity or said second cavity.

14. A fishing lure adjustable between a rattling mode and a muted mode when agitated, said fishing lure comprising:
a body having a body length, a body width and a body height;
a rattle chamber in said body extending along said width of said body;
a muted chamber in said body;
a channel in said body having a channel length along the body length of said body, said channel indirectly connecting said rattle chamber with said muted chamber, said channel having a constant cross-sectional area along said channel length between said rattle chamber and said muted chamber; and
a rattle having a central rattle cross-sectional area, said rattle housed in said body and moveable between said muted chamber and said rattle chamber within said channel;
wherein said muted chamber includes a muted chamber cross-sectional area to prevent the movement of said rattle along the width of said body; and
wherein said rattle chamber includes a rattle chamber cross-sectional area allowing rattling movement of said rattle along the width of said body.

15. The fishing lure as described in claim 14, wherein said channel length comprises a first length adjoining said rattle chamber, a second length connected with said first length, and a third length positioned between said second length and said muted chamber.

16. The fishing lure as described in claim 15 wherein said second length of said channel is curved.

17. The fishing lure as described in claim 15, wherein said channel comprises an inner surface and an outer surface substantially parallel to said inner surface, further comprising:
a first interior angle using said interior surface of said channel between said first length and said second length; and
a second interior angle in said interior surface of said channel between said second length and said third length, said first interior angle and said second interior angle being acute.

18. The fishing lure as described in claim 15 wherein said muted chamber substantially abuts said rattle chamber.

19. The fishing lure as described in claim 15, said channel providing an indirect path to selectively contain said rattle in said rattle chamber or said muted chamber.

* * * * *